No. 12,662. REISSUED JUNE 18, 1907.
J. F. SCANLAN.
BRUSH FOR CLEANING HORSES.
APPLICATION FILED MAR. 19, 1907.
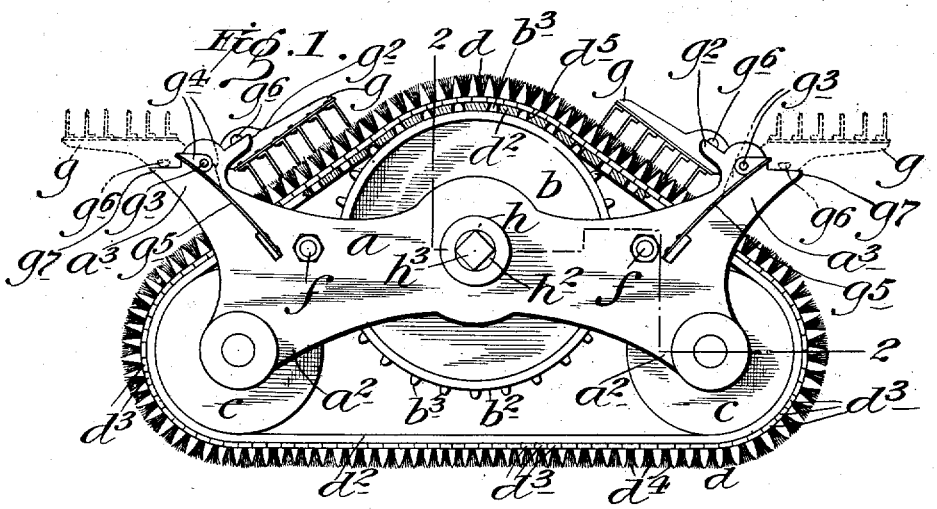
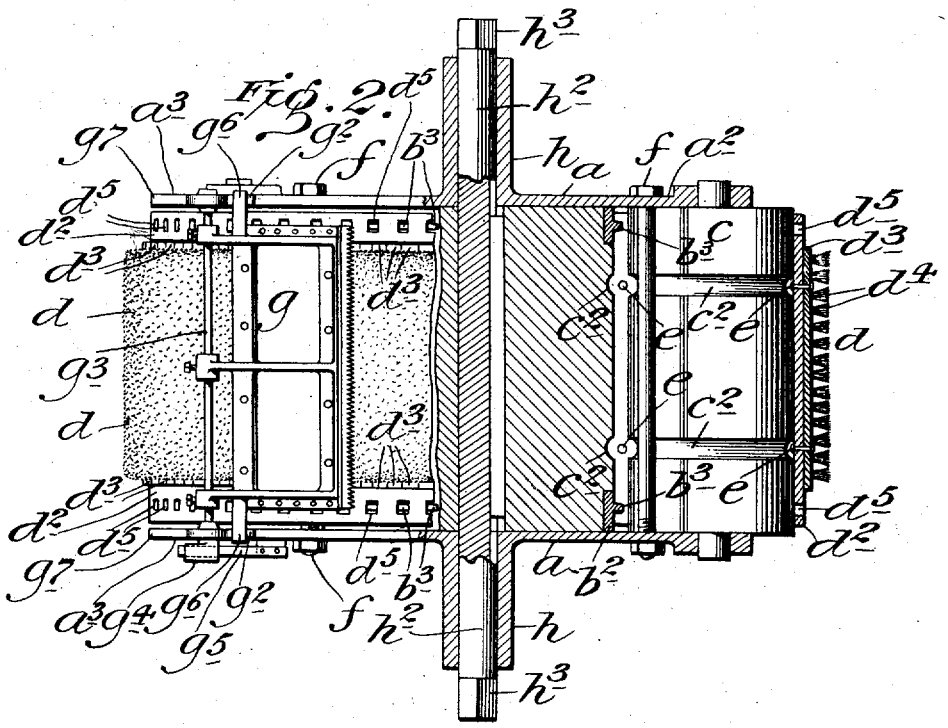
WITNESSES
A. L. Appleman
C. E. Mulreany
INVENTOR
Joseph F. Scanlan
BY
Edgar Tate & Co.
ATTORNEYS.
THE NORRIS PETERS CO., WASHINGTON, D. C.

UNITED STATES PATENT OFFICE.

JOSEPH F. SCANLAN, OF NEW YORK, N. Y.

BRUSH FOR CLEANING HORSES.

No. 12,662. Specification of Reissued Letters Patent. Reissued June 18, 1907.

Original No. 793,234, dated June 27, 1905. Application for reissue filed March 19, 1907. Serial No. 363,327.

*To all whom it may concern:*

Be it known that I, JOSEPH F. SCANLAN, a citizen of the United States, residing in the borough of Brooklyn, city of New York, county of Kings, and State of New York, have invented certain new and useful Improvements in Brushes for Cleaning Horses, of which the following is a specification, such as will enable those skilled in the art to which it appertains to make and use the same.

This invention relates to brushes for cleaning horses; and the object thereof is to provide an improved device of this class which may also be used for cleaning other animals and for cleaning floors and walls of buildings and for cleaning carpets and for various other purposes.

The invention is fully disclosed in the following specification, of which the accompanying drawings form a part, in which the separate parts of my improvement are designated by suitable reference characters in each of the views, and in which;

Figure 1 is a side view of a brush embodying my invention; and, Fig. 2 a section on the line 2—2 of Fig. 1.

In the practice of my invention I provide a main frame comprising two side members or plates $a$, centrally of which is a main cylindrical rotatable drum wheel, or similar device $b$, provided at its perimeter and at the opposite ends thereof with bands $b^2$, having sprocket teeth $b^3$. The ends of the side members or plates $a$ are widened and provided with oppositely directed members $a^2$ and $a^3$, and mounted in the members $a^2$ are rollers $c$.

An endless brush $d$ is mounted on the central rotatable device $b$ and on the rollers $c$, and this brush comprises a strip or band $d^2$ of leather or other suitable flexible material, to which are secured transverse strips $d^3$ of leather, wood, or other suitable material and to which are secured in transverse rows the tufts $d^4$ of brush material. The endless belt or band $d^2$ of the endless brush $d$ is wider than the transverse strips $d^3$, to which the brush material is secured, and the side portions thereof are provided with holes $d^5$, through which the sprocket teeth $b^3$ of the rotatable drum or device $b$ pass. I prefer in practice to secure the transverse strips $d^3$ to the endless belt or band $d^2$ of the brush $d$ by means of rivets $e$, as shown at the right-hand side of Fig. 2, and the rollers $c$ are provided in their perimeters with grooves $c^2$ to receive the head of these rivets, and the main rotatable drum, roller, or device $b$, if made solid, as shown in Fig. 2, is also provided with similar grooves $c^2$ for the same purpose.

The separate side plates $a$ of the main frame are secured together by means of bolts $f$ or in any desired manner, and between the parts or members $a^3$ of said side plates are pivoted ordinary currycombs or similar devices $g$, both of which may be held so that the teeth thereof will bear on the brush $d$ between the rollers $c$ and the rotatable device $b$, as shown in full lines, and both of which may be turned outwardly or backwardly, as shown in dotted lines in Fig. 1, so that they may be cleaned. The parts or members $a^3$ of the main frame are provided with fingers $g^2$, which project inwardly and upwardly parallel with those portions of the brush $d$ which pass over the main rotatable drum, roller, or device $b$, and the combs $g$ are pivoted in the frame member $a^3$ by means of rods $g^3$, having cam-blocks $g^4$ at the ends thereof, and springs $g^5$ are secured to the frame members $a^3$ so as to bear on said cam blocks, and the position and shape of the cam blocks $g^4$ are such that the springs $g^5$ will hold the combs $g$ in the closed position shown in full lines in Fig. 1, or in the open position shown in dotted lines in said figure, and the said combs $g$ are provided at their opposite sides with lugs or projections $g^6$, which bear on the fingers $g^2$ in the closed position of said combs, so that said combs will come in proper contact with the brush material of the brush $d$ in the operation of the device, as hereinafter described, and the frame members $a^3$ are provided with outwardly directed fingers $g^7$, on which the lugs or projections $g^6$ of the combs $g$ rest when said combs are in the open position, as shown in dotted lines in Fig. 1.

The side plates $a$ of the main frame are provided at the opposite sides of said main frame with tubular trunnions $h$, and the shaft or axle $h^2$ of the main rotatable device $b$ is extended through said trunnions and provided at its opposite ends with angular portions or similar devices $h^3$, with which a crank or other operating device may be connected, and the trunnions $h$ form right and left handles, by which the device may be held in the operation of using the device to clean a horse or other animal or for any other purpose for which it may be employed.

It will be understood that this device may be operated in the manner of an ordinary clipping-machine, or it may be operated by hand; but in any event it is held in position for use by means of the trunnions *h*, which constitute handles.

In the operation of this device for cleaning a horse the said device is held so that that portion of the endless brush *d* between the rollers *c* bears on the horse, and it will be understood that this portion of the endless brush is flexible and yielding, and in using the device for any other purpose it is held in the same manner, that portion of the brush between the rollers *c* being held in contact with the animal or article to be cleaned.

The combs *g* when the device is in use occupy the position shown in full lines in Fig. 1, and the brush material as it passes beneath the teeth of said combs is cleaned thereby, the dandruff, dirt, or other substances being removed from the brush by the combs and held by the teeth thereof, and whenever it is desired to clean said combs they are turned backwardly into the position shown in dotted lines in Fig. 1, in which position the said combs may be cleaned in the usual manner. The use of the combs *g* is not absolutely essential, as the brush *d* may be cleaned in other ways, and when these combs are not employed the projecting frame members $a^3$ of the side plates *a* will be omitted.

In the construction shown the main rotatable roller, drum, or device *b* is made solid, and when this is the case it may be composed of wood, cork, or any other suitable material; but said roller, drum, or device *b* may be made of framework or spider-work, all that is necessary being to provide two annular rows of sprocket teeth $b^3$, which will operate in connection with and drive the endless brush *d*.

Constructed as described it will be seen that my improvement comprises a main oblong frame, rollers mounted in the opposite ends thereof, an endless belt brush mounted on said rollers, a handle connected with said frame centrally of a side thereof, a driving shaft passing through said handle, and means whereby the rotation of said shaft will turn said brush, together with other details of construction as herein shown and described.

Having fully described my invention, what I claim as new and desire to secure by Letters Patent, is:—

1. A device of the class described, comprising a main oblong frame composed of side plates, a central cylindrical rotatable member mounted between said side plates centrally thereof and provided at the opposite ends thereof with sprocket teeth, rollers mounted in the opposite ends of the main frame and at one side of a plane passing centrally and longitudinally through said frame and through the rotatable member, and an endless brush mounted on said central rotatable member and said rollers and provided in the opposite sides thereof with holes adapted to receive said sprocket teeth.

2. A device of the class described, comprising a main oblong frame composed of side plates, a central cylindrical rotatable member mounted between said side plates centrally thereof and provided at the opposite ends thereof with sprocket teeth, rollers mounted in the opposite ends of the main frame and at one side of a plane passing centrally and longitudinally through said frame and the rotatable member, and an endless brush mounted on said central rotatable member and said rollers and provided in the opposite sides thereof with holes adapted to receive said sprocket teeth, said main frame being also provided in the opposite ends thereof and opposite said rollers with combs which are pivoted therein and adapted in one position to bear on said brush.

3. A device of the class described, comprising a main oblong frame composed of side members, said side members being provided centrally with oppositely directed trunnions, a main cylindrical rotatable member mounted in the main frame and provided with a shaft passing through said trunnions, said rotatable member being also provided at the opposite ends thereof with sprocket teeth, rollers mounted in the opposite ends of the main frame and at one side of a plane passing centrally and longitudinally through said main frame and said rotatable member, and an endless brush mounted on said rotatable member and said rollers and adapted to be driven by the sprocket teeth on said rotatable member.

4. A device of the class described, comprising a main frame composed of side plates having central trunnions which project in opposite directions, a main cylindrical rotatable member mounted between said side plates and provided with a shaft which passes through said trunnions, said rotatable member being also provided at its opposite ends with sprocket teeth, rollers mounted in the ends of the main frame at one side of a plane passing centrally and longitudinally through said frame and through the center of the rotatable member, an endless brush mounted on said rotatable member and said rollers and adapted to be driven by said sprocket teeth, combs pivoted in the opposite ends of the main frame and adapted to bear on said brushes and between said rollers and said main rotatable member, and means for holding said combs both in and out of contact with said brush.

5. A device of the class described, comprising a main oblong frame, a central cylindrical rotatable member mounted therein, rollers mounted in the opposite ends of said frame and at one side of a plane passing centrally and longitudinally through said frame and the central cylindrical rotatable member, an endless brush mounted on said central cylindrical rotatable member and on said rollers, and means whereby the turning of said central cylindrical rotatable member will turn said brush thereon and on said rollers.

6. In a brush of the class described, a main oblong frame, an endless belt brush mounted in said frame, a handle connected with said frame centrally of a side thereof, a driving shaft passing through said handle, and means whereby the rotation of said shaft will turn said brush.

7. In a brush of the class described, a main oblong frame, an endless belt brush mounted in said frame, handles connected with the opposite sides of the frame centrally thereof, a driving shaft passing through said handles, and means whereby the rotation of said shaft will turn said brush.

8. In a brush of the class described, a main oblong frame, rollers mounted in the opposite ends thereof, an endless belt brush mounted on said rollers, a handle connected with said frame centrally of a side thereof, a driving shaft passing through said handle, and means whereby the rotation of said shaft will turn said brush.

9. In a brush of the class described, a main oblong frame, rollers mounted in the opposite end portions thereof, an endless belt brush mounted on said rollers, handles connected with the opposite sides of the frame centrally thereof, a driving shaft passing through said handles, and means whereby the rotation of said shaft will turn said brush and said rollers.

In testimony that I claim the foregoing as my invention I have affixed my signature hereto in the presence of the subscribing witnesses this 18th day of March, 1907.

JOSEPH F. SCANLAN.

Witnesses:
C. E. MULREANY,
A. WORDEN GIBBS.